United States Patent [19]
Bartel et al.

[11] 4,025,025
[45] May 24, 1977

[54] APPARATUS FOR SCANNING A MARKED WEB

[75] Inventors: Siegfried Bartel, Gauting; August Hell, Deisenhofen, both of Germany

[73] Assignee: AGFA-Gevaert, A.G., Leverkusen, Germany

[22] Filed: Aug. 5, 1976

[21] Appl. No.: 711,871

Related U.S. Application Data

[62] Division of Ser. No. 581,572, May 28, 1975, abandoned.

[30] Foreign Application Priority Data

May 30, 1974 Germany .......................... 2425955

[52] U.S. Cl. ................................. 226/33; 226/45; 250/202; 250/548; 101/181
[51] Int. Cl.² ........................................ B65H 25/24
[58] Field of Search ............ 226/15, 16, 24, 27–30, 226/33, 45; 250/202, 548; 101/181

[56] References Cited

UNITED STATES PATENTS

| | | | |
|---|---|---|---|
| 2,082,634 | 6/1937 | Johnstone | 250/548 X |
| 2,489,305 | 11/1949 | McLennan | 250/202 |
| 3,031,118 | 4/1962 | Frommer | 226/45 X |
| 3,244,418 | 4/1966 | Henderson | 226/45 X |
| 3,783,293 | 1/1974 | Gold et al. | 226/45 X |

Primary Examiner—Robert W. Saifer
Attorney, Agent, or Firm—Michael J. Striker

[57] ABSTRACT

A web of photographic paper having at its rear side at least one longitudinally extending reference line and at least one row of equally spaced marks which is parallel to the reference line. The reference line and the marks are applied below a coat of liquid-repellent synthetic plastic material. The reference line is scanned by a first photoelectric detector and the row of marks is scanned by a second photoelectric detector which remains in register with the row of marks because the first detector is maintained in register with the reference line by a follow-up control system. The second detector furnishes signals which are used to arrest the advancing rolls for the web in a photoelectric copying machine or subsequent to development of images so that the web is severed during each interval of stoppage.

The reference line and the marks are applied simultaneously but prior to the application of photosensitive emulsion to the front side of the web.

16 Claims, 5 Drawing Figures

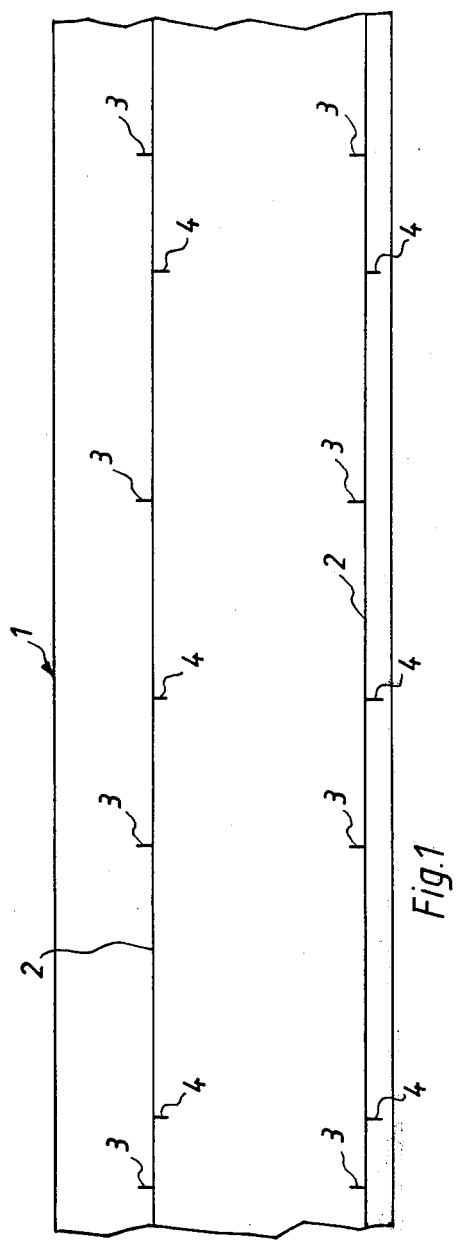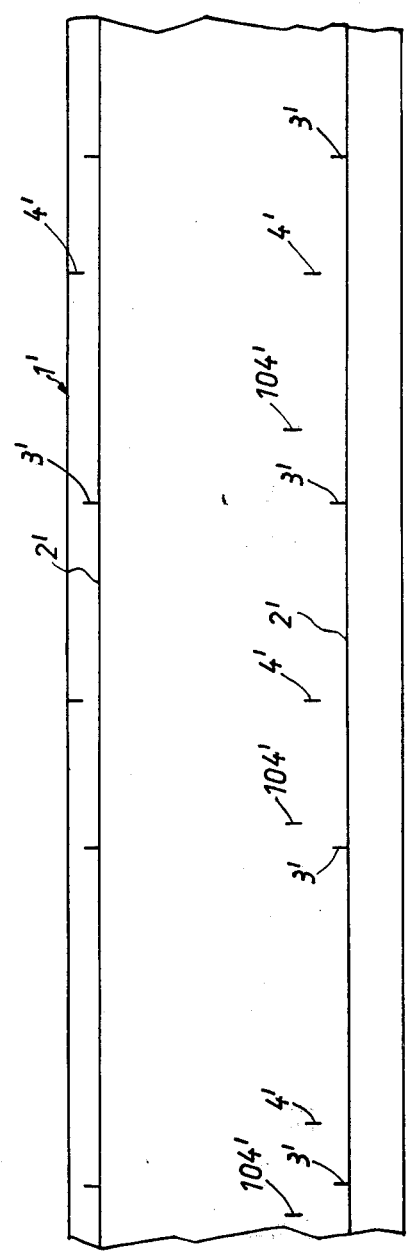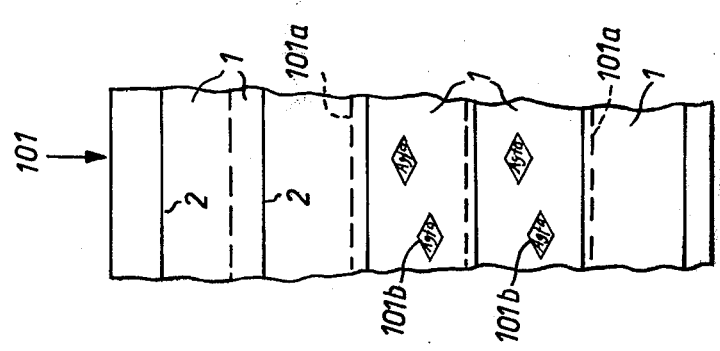

APPARATUS FOR SCANNING A MARKED WEB

This is a division of application Ser. No. 581,572, filed May 28, 1975, now abandoned.

BACKGROUND OF THE INVENTION

The present invention relates to a method of applying indicia to sheet-like materials, especially to a method of applying indicia to webs or strips of photographic paper. More particularly, the invention relates to improvements in a method of applying indicia to the rear sides of webs of photographic paper for the purpose of controlling the movements of such webs in copying machines wherein the paper is exposed to light passing through or reflected by originals and the thus obtained images are thereupon developed and fixed prior to severing of webs to form discrete prints or series of prints. The invention also relates to strips or webs which are provided with such indicia and to apparatus for detecting the indicia in a photographic copying machine or the like.

In accordance with presently prevailing techniques, indicia (hereinafter called marks for short) which are monitored to arrest webs of photographic paper immediately prior to severing are applied to the rear sides of webs during copying. Such procedure is not entirely satisfactory because the advancing mechanism for the web must be operated with an extremely high degree of accuracy in order to insure that the knife or knives will sever the web exactly across the center of a frame line between two neighboring images on the exposed and developed web.

Furthermore, it is now customary to coat photographic paper with a layer of water-repellent synthetic plastic material, such as polyethylene, in order to prevent the paper from absorbing excessive quantities of liquid during the transport through a developing machine. The application of marks onto the plastic layer at the rear side of photographic paper presents serious problems; in many instances, the marks cannot be readily discerned upon completion of developing treatment, i.e., they do not stand out sufficiently from the surrounding area at the rear side of the web so that they cannot be readily detected by available photoelectric or other monitoring means. The developing treatment involves contacting photographic paper with aggressive liquids which often attack the marks and render them illegible. Therefore, it happens again and again that the monitoring devices "overlook" a mark or that overly sensitive monitoring devices produce signals in response to detection of dust particles, faint blemishes or other imperfections which are not intended to cause stoppage of the web in a photographic copying or like machine.

SUMMARY OF THE INVENTION

An object of the invention is to provide a novel and improved method of applying marks and other indicia onto the rear sides of webs or strips which consist of photographic paper or other flexible material.

Another object of the invention is to provide a method which insures the formation of indicia that can be readily detected in a photographic copying or like machine and which can be utilized to produce such indicia simultaneously with other treatment or treatments of photographic paper.

A further object of the invention is to provide a method of producing marks and other indicia which can readily withstand the corrosive influence of liquids during transport of photographic paper through a developing machine.

An additional object of the invention is to provide a method of applying marks to rear sides of webs or strips of photographic paper simultaneously with the application of other indicia which are necessary for automatic processing of such paper in photographic copying or other machines.

An additional object of the invention is to provide a method of the above outlined character which can be utilized for accurate and reproducible application of indicia to webs or strips of photographic paper or the like without resorting to costly, complex and sensitive metering equipment.

A further object of the invention is to provide a method of producing a plurality of photographic paper webs simultaneously with the application of indicia to each such web in a time-, material and equipment-saving operation.

Another object of the invention is to provide a method which can be practiced by resorting to simple and inexpensive instrumentalities.

Still another object of the invention is to provide a web or strip to which the indicia are applied in accordance with the above outlined method.

Another object of the invention is to provide a novel and improved apparatus for monitoring indicia which are applied to webs or strips of photographic paper or the like in accordance with the above outlined method.

A further object of the invention is to provide a versatile apparatus which can be readily adjusted to monitor selected indicia at the rear sides of photographic paper webs or the like.

One feature of the invention resides in the provision of a method of applying automatically detectable indicia (i.e., indicia which can be detected by photoelectric or other monitoring or scanning devices) to elongated webs, particularly of applying to the rear sides of photographic paper webs indicia including marks which are to be scanned for the purpose of controlling stepwise movements of photographic paper in photographic copying machines or the like (preferably for initiating stoppage of web advancing means prior to exposure of photographic emulsions on photographic paper webs, or the stoppage of means which advances an exposed and developed web into the range of a severing device serving to subdivide the web into a succession of prints). The method comprises the steps of applying to one side (preferably to the rear side) of a web at least one elongated (preferably straight) reference line which extends lengthwise of the web and constitutes a first indicium, and applying to the one side of the web a plurality of spaced-apart marks constituting second indicia and forming at least one row which is parallel to the reference line and whose marks are preferably equally spaced from each other. The reference line is preferably applied simultaneously with the marks, and the web is preferably moved lengthwise while the reference line and the marks are being applied thereto by resorting to suitable inking or analogous instrumentalities. The method may further comprise the step of applying to the one side of the web a plurality of additional marks constituting additional indicia which form at least one additional row parallel to the reference line. The distance between the marks of the first mentioned row and the reference line may equal or exceed the distance between the reference line and the additional row of marks, all rows of marks may be disposed at one side of the reference line, at least one row of marks may touch the reference line, or the marks of the first mentioned row may be disposed at one side and the marks of the additional row may be disposed at the other side of the reference line.

The method may further comprise the step of coating at least the one side of the web with a layer of liquid-repellant material (e.g., polyethylene) so that the layer overlies the indicia and protects them from the influence of corrosive liquids in a developing machine or the like. Still further, the method may comprise the step of coating the other side of the web with a photosensitive emulsion subsequent to completion of the indicia-applying steps.

If the web is relatively wide, the first step may comprise applying to one side of the wide web a plurality of straight parallel reference lines, and the second applying step then comprises applying at least one row of marks adjacent to each reference line. Such method further comprises the step of subdividing the wide web into a plurality of narrower webs each of which has at least one reference line and at least one row of marks. The indicia-applying steps may be carried out simultaneously with the subdividing step. The method may further comprise the steps of moving the wide web lengthwise along a predetermined path and coating the one side of the wide web with a layer of liquid-repellant material in a first portion of the path. The subdividing step is then carried out in a second portion of such path downstream of the first portion, and the indicia-applying steps are carried out in a third portion of the path ahead of the first portion so that the layer overlies the indicia.

The indicia may consist of printing ink which absorbs light in the non-actinic range of the spectrum, of printing ink which absorbs infrared light, of printing ink which absorbs ultraviolet light, of fluorescent material or of magnetic pigments.

The method may further comprise the step of applying to the one side of the web a pattern of indicia constituting the trademark, trade name and/or the name of a manufacturer. Such indicia are out of register with the marks, as considered in the longitudinal direction of the row or rows of marks.

The reference line at the rear side of a web is scanned by a first detector, preferably a photoelectric detector, and the row of marks is scanned by a second detector which is laterally offset with respect to the first detector by a distance corresponding to that between the reference line and the row of marks to be scanned. The first detector is movable by a follow-up control transversely of the web so that it continues to scan the reference line even if the latter is not absolutely straight, whereby the second detector invariably remains in register with the row of marks to be scanned. The signals which are produced by the second detector in response to detection of successive marks are used to initiate the stoppage of a motor for advancing means (e.g., a pair of rollers) which moves the web lengthwise in a photocopying machine or through a machine which is to sever the web across successive frame lines so that the web yields a succession of discrete prints.

The novel features which are considered as characteristic for the invention are set forth in particular in the appended claims. The improved web itself, however, both as to its construction and the method of applying indicia thereto, together with additional features and advantages thereof, and the apparatus for monitoring the indicia on the web, will be best understood upon perusal of the following detailed description of certain specific embodiments with reference to the accompanying drawing.

BRIEF DESCRIPTION OF THE DRAWING

FIG. 1 shows a portion of the rear side of a web of photographic paper which is provided with indicia in accordance with the method of our invention;

FIG. 1a shows a portion of a wider web or strip which must be severed to yield several webs of the type shown in FIG. 1;

FIG. 2 shows the rear side of a portion of a web having different indicia;

DESCRIPTION OF THE PREFERRED EMBODIMENTS

Figure 3:
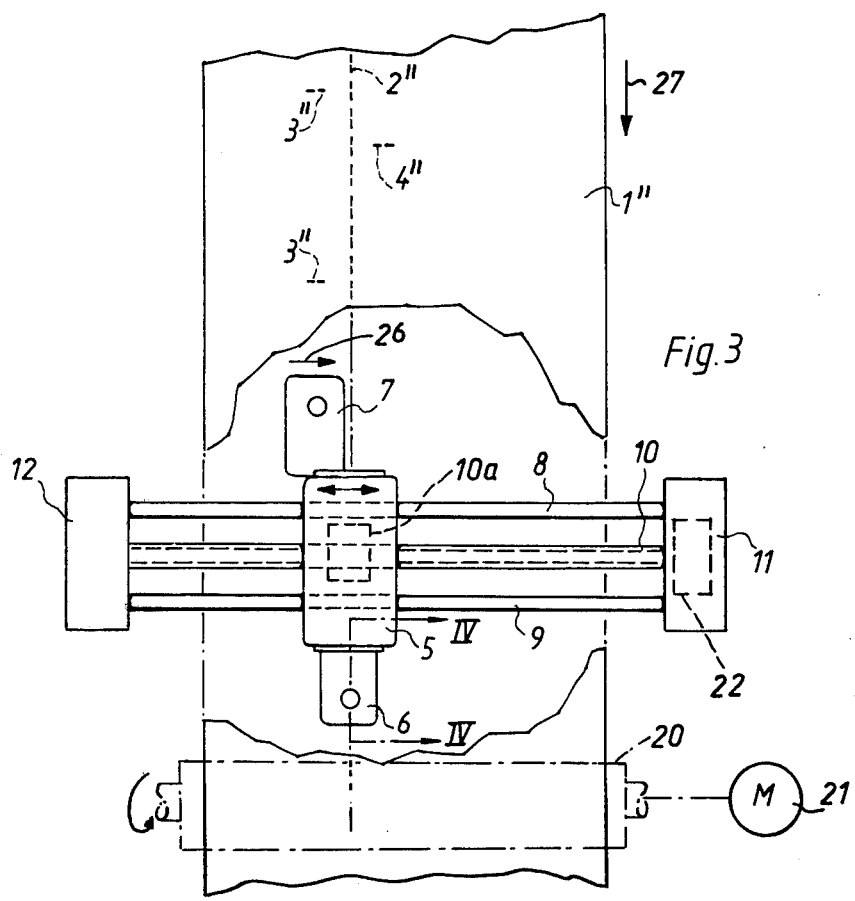
FIG. 3 is a schematic plan view of an apparatus for scanning indicia at the rear side of a web whereon the indicia are distributed in a manner deviating slightly from that shown in FIG. 1 or 2.

Referring first to FIG. 1, there is shown a portion of a web 1 of photographic paper. The rear side of the web has two elongated straight parallel reference lines 2 which extend lengthwise of the web, and two sets of marks 3, 4 for each reference line. Each set of marks 3 forms a first row, each set of marks 4 forms a second row, the marks 3 of each first row are located at a predetermined distance from the respective reference line 2, and the marks 3 of each second row are also located at a predetermined distance from the respective line 2. In the embodiment of FIG. 1, the marks 3 of each first row touch one side of the respective reference line 2. The marks 3 of each first row and the marks 4 of each second row are equally spaced from each other whereby the distance between two neighboring marks 4 of a second row exceeds the distance between two neighboring marks 3 of a first row. The marks 4 of each second row are applied at the same predetermined distance from the respective reference line 2 as the corresponding marks 3; in the embodiment of FIG. 1, the marks 4 of each second row touch the other side of the respective line 2. Each row of marks 3 or 4 is parallel to the reference lines 2. The distance between two neighboring marks 3 of a first row equals the distance between successive transverse cuts across the web 1 upon completion of printing and development in a photographic copying machine; for example, the distance between two neighboring marks 3 of a first row may be 4 inches. The distance between two neighboring marks 4 of a second row may be five inches.

FIG. 1a shows that the web 1 may be obtained in response to severing of a much wider web or strip 101 the rear side of which has a large number of equally spaced reference lines 2, a first row of marks 3 and a second row of marks 4 for each reference line (such marks are not shown in FIG. 1a). The relatively wide strip 101 is then subdivided into several discrete webs 1 (the planes of rotary cutting knives which are used to carry out such severing operation are indicated by broken lines 101a). In order to save time in the making of webs 1, it is preferred to imprint the indicia including the reference lines 2 and marks 3, 4 simultaneously with severing of the strip 101 at 101a. To this end, the strip 101 may be transported past an imprinting or encoding station where the rear side of the strip is provided with reference lines 2 and marks 3, 4 and which is located immediately upstream or not too far away from and ahead of a severing station where the aforementioned knives sever the strip 101 at 101a so that such strip yields a plurality of discrete webs 1 having a desired width. Each of the webs 1 which are obtained in response to severing of the strip 101 has at least one reference line 2 and at least one row each of marks 3 and 4. In order to make sure that each web 1 will have at least one reference line 2 and at least one row of marks 3 and 4, the distances between neighboring reference lines 2 at the rear side of the strip 101 at most equal but may be less than the width of narrowest webs 1 which are to be obtained in response to severing of the strip 101. As shown in FIG. 1a, the width of a web 1 exceeds the shortest distance between two neighboring parallel reference lines 2 so that one or more webs 1 will have more than one reference line. In order to avoid losses in time for adjustment of the apparatus which applies the indicia 2-4, a strip 101 can be provided with a relatively large number of rather closely adjacent parallel reference lines 2 even if the strip is thereupon subdivided into webs having a width exceeding that of the webs 1 shown in FIG. 1a. All that counts is to make sure that each of the webs will have at least one reference line 2, at least one row of marks 3 and at least one row of marks 4. Of course, if the manufacturer knows that the apparatus for the making of photographic paper webs is to produce a very substantial number of webs 1 having a given width, the printing or encoding apparatus can be adjusted in such a way that the distance between neighboring reference lines 2 will equal the width of a finished web 1 (i.e., that the rear side of each web 1 will have a single reference line) and that the encoding apparatus will apply only the rows of marks 3 or only the rows of marks 4, depending upon the desired format of prints which are obtained in response to severing of webs 1 upon completion of the copying operation, e.g., in a large developing plant which receives exposed but underdeveloped photographic films from dealers and/or directly from customers.

The reference lines 2 and the marks 3, 4 can be applied to the rear side of a strip 101 simultaneously or substantially simultaneously with a pattern of trademarks and/or names of the manufacturer. FIG. 1a shows (at 101b) the trademarks of the maker; these trademarks are preferably distributed on the strip 101 in such a way that each of the webs 1 carries at least one row of such indicia, i.e., so that each discrete print which is to be obtained in response to severing of the web 1 along successive marks 3 or 4 will have at least one indicium 101b. The indicia 101b are out of register with the marks 3, 4, as considered in the longitudinal direction of the strip 101.

The application of marks 3 in addition to the application of marks 4, or vice versa, is desirable because this enhances the versatility of the webs 1. Thus, each such web can be used for the making of prints having a length corresponding to that between two neighboring marks 3 or corresponding to that between two neighboring marks 4. Also, at the time the strip 101 is being made and provided with encoded information, the manufacturer might not know whether the strip 101 is to be subdivided into webs 1 having a width such that they must be severed at the marks 3 or a different width such that the webs must be severed at the marks 4. The simultaneous application of marks 3 and 4 further results in savings for imprinting equipment because it is not necessary to maintain in readiness printing equipment which can apply only the reference lines together with the marks 3 and indicia 101b as well as printing equipment which must be used to apply reference lines 2, marks 4 and indicia 101b.

As a rule, photographic raw paper is coated with a preparation of barium sulfate (baryta) before the emulsion is applied. Baryta improves the texture and certain other characteristics of photographic paper. In accordance with presently known methods, the application of baryta is followed by the imprinting of a patter of manufacturer's trademarks and/or names, and this imprinting step is followed by the step of coating the paper with a film or layer of water repellent synthetic plastic material (mostly polyethylene). In the last step, the paper is coated, at its front side, with a photosensitive emulsion. In many instances, the strips 101 are rather wide, e.g., approximately 80 centimeters, and such strips are severed (subsequent to the application of photosensitive emulsion) by resorting to a severing device resembling a roller with several equally spaced disc-shaped knives. The application of manufacturer's name and/or trademark is effected by a transfer process which is carried out by resorting to a rotary drum which contacts the rear side of the strip 101 and is continuously supplied with a suitable printing ink.

In accordance with our method, the application of a pattern of indicia 101b (if such indicia are to be applied at all) takes place subsequent to coating of strips 101 with baryta but prior to coating with water repellent plastic material and simultaneously with the application of indicia 2, 3, 4. This insures that such indicia are protected by the film of polyethylene and are not likely to disappear during development of images of originals (e.g., frames of photographic films) which are exposed onto the photosensitive emulsions of discrete webs 1 in a photographic copying machine. The strip 101 can be moved lengthwise along a fixed path; the indicia can be applied in a first portion of such path; the coat of polyethylene in a second portion of the path downstream of the first portion; and the strip 101 is thereupon severed in a third portion of the path downstream of the second portion.

FIG. 2 shows the rear side of a second web 1' which may but need not have the same width as the web 1 of FIG. 1. The web 1' has one or more parallel straight reference lines 2' which extend lengthwise of the web and at least one of which is associated with three rows of marks 3', 4' and 104'. Each reference line 2' is immediately adjacent to and is actually contacted by the respective marks 3'. The marks 4' are spaced apart from the respective reference line 2' and the distance between two neighboring marks 4' exceeds that between two neighboring marks 3'. The marks 104' are remotest from the respective reference lines 2' (FIG. 2 merely shows a single row of marks 104' which are adjacent to the upper side of the lower reference line 2'). The distance between two neighboring marks 104' is less than that between two neighboring marks 4' but exceeds that between two neighboring marks 3'.

The web 1' exhibits the advantage that it can be properly subdivided into prints having three different formats by serving the web at successive marks 3', 4' or 104'. It will be noted that all of the marks 3', 4', 104' which are associated with a given reference line 2' are located at the same side of such reference line (at the upper side, as viewed in FIG. 2). The distance between the marks 3', 4' or 104' and the respective reference line 2' is always the same, i.e., the marks 3' form a first row which is parallel with the reference line 2', the marks 4' form a second row which is parallel to the line 2', and the marks 104' also form a row which is parallel to the reference line.

The material of the indicia 2–4, 101b, 2'–4', 104' may be a readily discernible printing ink. This does not affect the accuracy of monitoring of indicia 3, 4, 3', 4' or 104': on the contrary, inks having a color which is substantially different from the background at the rear side of a web 1 or 1' can be more readily discerned by photoelectric monitoring devices. Care should be taken to avoid the application of indicia 101b in register with the rows of marks 3, 4, 3', 4' or 104' because the indicia 101b could be detected by devices which scan the rear side of a web for the marks 3, 4, 3', 4' or 104' whereby the detection of an indicium 101b could result in severing of the web 1 or 1' at an inopportune time, e.g., midway across a point.

If desired, the indicia 101b, 2–4, 2'–4' and 104' can be applied by resorting to a substance which cannot be detected by conventional photoelectric monitoring devices because the light sources of such devices emit light of a different wave length and/or because their receivers are sensitive to light of a different wave length. The application of coloring matter which cannot be detected by presently used photoelectric monitoring devices (i.e., by those monitoring devices which are used in existing copying machines for other purposes) insures that the indicia 2–4, 2'–4', 104', 101b cannot be detected by existing monitoring devices so that such indicia do not interfere with proper operation of existing copiers. The just enumerated indicia would have to be applied (by using the aforementioned special dye) in addition to those indicia which are to be scanned by existing photoelectric monitoring devices, e.g., to detect the end of a series of prints made from a length of photographic film, to detect a splice, or for other purposes. For example, the material of the indicia can absorb infrared or ultraviolet light.

It is also within the purview of the invention to provide the web 1, 1' or 1" with indicia which are applied by resorting to magnetic pigments, to fluorescent substances, by tools which scratch and/or depress selected portions of the rear side of the web to thereby produce indicia in the form of reference lines, marks and/or patterns of trade names or the like. All that counts is to provide indicia which are readily detectable, either photoelectrically or mechanically.

An important advantage of the improved method is that the indicia are applied prior to passage of the web 1 or 1' through a photographic copying machine, i.e., prior to imaging of originals onto the emulsion at the front side of the web. Such early application of indicia renders it possible to provide a web 1, 101 or 1' with indicia simultaneously with other treatments to which a web of photographic paper is normally subjected prior to passage through a copying machine. Thus, and as mentioned above, the indicia can be applied simultaneously with a pattern of trademarks 101b, simultaneously with or immediately prior to coating of the web with a liquid-repellent substance, and simultaneously with or immediately prior to subdivision of a wide web or strip 101 into two or more narrower webs. Such timing of the application of indicia reduces the manufacturing cost, especially if the indicia are applied simultaneously with a pattern of trademarks because such pattern is to be found on all or nearly all types of photographic paper.

Another important advantage of the improved method is that it practically excludes the possibility of making prints having different sizes. This will be readily appreciated since the marks 3, 4, 3', 4' or $\psi'$ can be readily applied at equal distances from each other during initial treatment of a web, i.e., if such marks are not applied simultaneously with imaging of originals onto the emulsion at the front side of a web. In the latter instance, the spacing between successive marks is dependent on accuracy of the advancing means for the web so that an error can be compounded with the result that each print of a series of prints will have a different length. Moreover, the operating speed of the copying machine can be increased because, in conventional copying machines which apply marks at the copying station, the application of a mark must precede or follow a copying operation because the mark would be blurred if it were applied during actual copying which invariably involves at least some shaking of the machine and of the web therein. In other words, if the marks are applied at the copying station, each period of dwell of the web includes a first interval during which an original is imaged onto the emulsion at the front side of the web and a second interval during which the web is provided with a mark adapted to be scanned subsequent to development for the purpose of arresting the web in an optimum position for severing by a set of knives or the like.

Figure 4:
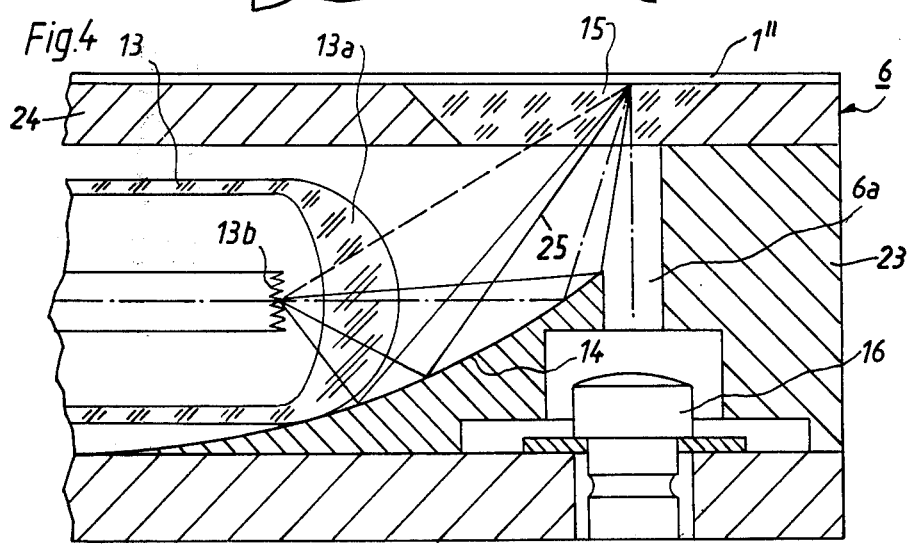
FIG. 4 is an enlarged fragmentary sectional view as seen in the direction of arrows from the line IV—IV of FIG. 3.

FIGS. 3 and 4 show certain details of an apparatus which serves to intermittently arrest the advancing means for webs of the type shown in FIGS. 1 and 3. The web 1" which is shown in FIGS. 3 and 4 is somewhat different from the webs 1 and 1' because the marks 3" as well as the marks 4" are spaced apart from the reference line 2". The marks 3" form a row of accurately aligned marks at one side and the marks 4" form a row of accurately aligned marks at the other side of the reference line 2". The two rows are parallel to the line 2". In FIG. 3, the web 1" is shown from above; therefore, the indicia 2"–4" are indicated by broken lines. The web 1" is partially broken away because the apparatus to be described is mounted therebelow (see also FIG. 4). The direction of intermittent movement of the web along a preferably horizontal path is indicated by an arrow 27.

The advancing means for the web 1" comprises two rolls including a driven roll 20 a portion of which is indicated by phantom lines and a second roll which is located opposite and is preferably biased toward the roll 20. The path for the web 1" extends through the nip of the two advancing rolls. The roll 20 is driven by a suitable motor 21 which is started by the controls of the copying machine and is arrested by the apparatus of FIG. 3 whenever a photoelectric monitoring device 7 detects a mark 3". Another photoelectric monitoring device 6 tracks the reference line 2" to insure that the monitoring device 7 remains in register with the row of marks 3".

The monitoring devices 6 and 7 are mounted on a carriage 5 which is reciprocable transversely of the web 1" along guide means including two horizontal tie rods 8 and 9. The follow-up control system for moving the carriage 5 along the tie rods 8, 9 comprises an elongated feed screw 10 which is mounted between and is parallel with the tie rods 8, 9 and whose end portions are rotatable in bearings provided therefor in supports 11 and 12 mounted at the opposite sides of the path of movement of the web 1''. The feed screw 10 meshes with a spindle nut 10a in the carriage 5 and can be driven by a motor 22 in the support 11. The motor 22 receives signals from the monitoring device 6 and insures that the feed screw 10 is rotated whenever the scanning means of the monitoring device 6 is out of exact register with the reference line 2''. If desired, the motor 22 can be replaced by a motor which is installed in or on the carriage 5 and rotates the spindle nut 10a with respect to the feed screw 10 which is then held against rotation about its axis. The ends of the tie rods 8, 9 are mounted in the supports 11, 12.

When the leader of the web 1'' is threaded between the rolls of the advancing means so that it is located above the carriage 5 of FIG. 3, the latter is adjusted lengthwise of the tie rods 8, 9 in such a way that the monitoring device 6 is in exact register with the reference line 2''. The monitoring device 7 is thereupon adjusted with respect to the carriage 5 so as to be in exact register with the nearest mark 3''. From then on, the device 6 controls the motor 22 with a view to insure that the scanning means of the device 6 is trained upon the line 2'' even if the line 2'' is not absolutely straight. This insures that the monitoring device 7 remains in register with the row of marks 3'' and produces an electric signal whenever its scanning means detects a mark 3''. Such signals are used to arrest the motor 21 so that the web 1'' is at a standstill whenever an original is imaged onto the photosensitive emulsion of the web 1'' or whenever the web is to be severed to separate a finished print therefrom. The manner in which the motor 22 is controlled by the monitoring device 6 to insure that the scanning means of this device remains in register with the reference line 2'' is well known from the art of photoelectric readers.

As stated above, the motor 22 will also compensate for eventual deviations of the indicium 2'' from a straight line: this is desirable because the distance between the marks 3'' and the reference line 2'' is constant so that the monitoring device 7 invariably detects each and every mark 3'' as long as the scanning means of the device 6 remains trained upon the line 2''.

A presently preferred construction of the monitoring device 6 is shown in FIG. 4. This device comprises a casing or housing 23 with a cover plate 24 having a light-transmitting pane 15 through which a narrow light beam 25 can pass to impinge upon the reference line 2'' at the underside of the web 1''. The casing 23 contains a horizontal light source 13 having a filament 13b located behind a lens 13a which directs the light beam 25 against an elliptic mirror 14. The latter reflects the beam against the underside of the pane 15. Light which is reflected by the reference line 2'' impinges upon a photosensitive transducer 16 located at one end of a light duct 6a, and the transducer 16 furnishes signals whenever the intensity of reflected light deviates from a predetermined intensity which is indicative that the light beam 25 is properly reflected by the reference line 2''. The transducer 16 is installed in the electric circuit of the motor 22 and controls the operation of this motor (and hence the position of the carriage 5 with respect to the marginal portions of the web 1'') in a well known manner not forming part of this invention.

If desired, the monitoring device 6 can comprise two closely adjacent transducers 16 which are in circuit with the motor 22 and serve to start the motor 22 in the proper direction whenever the intensity of light which is being reflected upon one of the transducers is weaker than the intensity of light impinging upon the other transducer. The light is reflected by the reference line 2''.

The construction of the monitoring device 7 may be similar to or identical with that of the monitoring device 6. When the transducer of the device 7 produces a signal, the motor 21 for the advancing roll 20 is arrested so that the web 1'' is at a standstill during imaging in the copying machine and/or during severing by a set of knives which convert the web 1'' into a series of discrete prints. The copying machine may comprise two apparatus of the type shown in FIG. 3. One of these apparatus arrests the web 1'' in response to detection of marks 3'' for the purpose of copying successive originals or for repeated copying of an original, and the other apparatus serves to arrest the web 1'' for the purpose of severing the web by restoring to a movable knife and a stationary counterknife or to other suitable severing means. The improved apparatus can be used with equal advantage for other purposes, i.e., whenever an intermittently driven web is to be arrested at intervals determined by the spacing of marks forming a row extending in parallelism with a reference line.

If the copying machine is to make larger prints, the monitoring device 7 is shifted with respect to device 6 in the direction indicated by arrow 26 so as to be in line with the row of marks 4''. The positions of the monitoring device 6 and of the carriage 5 with respect to the web 1'' remain unchanged.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a machine wherein an elongated web is transported longitudinally along a predetermined path and one side of the web has at least one longitudinally extending reference line and a plurality of equally spaced marks forming at least one row which is parallel to the reference line, a combination comprising means for advancing the web lengthwise along said path; and means for intermittently arresting said advancing means, including a first detector arranged to scan the reference line at said one side of the web in said path, means for moving said detector transversely of said path so as to maintain said detector in register with said reference line, and a second detector connected to and movable with said first detector and being in register with said row of marks, said second detector having means for producing signals in response to detection of successive marks and such signals serving to arrest said advancing means.

2. A combination as defined in claim 1, wherein said first detector has means for producing second signals when said first detector is out of exact register with said reference line and said means for moving said first detector comprises a follow-up control system which is responsive to said second signals.

3. A combination as defined in claim 1, wherein said web has several rows of marks each of which is parallel with said reference line, said second detector being movable relative to said first detector into register with a selected row of marks on the web in said path.

4. A combination as defined in claim 1 wherein said web is a photographic web, said web having a first side and a second side and being provided at one of said sides with a plurality of automatically detectable indicia, said indicia including said at least one longitudinally extending reference line and said plurality of spaced marks forming said at least one row which is parallel to said reference line.

5. A combination as defined in claim 4, wherein said reference line is at least substantially straight and said marks are equally spaced from each other.

6. A combination as defined in claim 4, said web further comprising a layer of liquid repellent material overlying said indicia.

7. A combination as defined in claim 4, said web further comprising a layer of photosensitive emulsion overlying the other of said sides.

8. A combustion as defined in claim 4, wherein said one side is provided with additional marks which constitute additional indicia and form at least one additional row which is also parallel to said reference line.

9. A combination as defined in claim 8, wherein the marks of the first-mentioned row and the marks of said additional row are respectively equidistant from each other, and wherein the distance between neighboring marks of one of said rows exceeds the distance between neighboring marks of the other of said rows.

10. A combustion as defined in claim 8, wherein the distance between said reference line and one of said rows exceeds the distance between the other of said rows and said reference line.

11. A combination as defined in claim 8, wherein the marks of at least one of said rows touch said reference line.

12. A combination as defined in claim 4, wherein said indicia consist of printing ink which absorbs light in the non-actinic range of the spectrum.

13. A combination as defined in claim 4, wherein said indicia consist of printing ink which absorbs infrared light.

14. A combination as defined in claim 4, wherein said indicia consist of printing ink which absorbs ultraviolet light.

15. A combination as defined in claim 4, wherein said indicia consist of fluorescent material.

16. A combination as defined in claim 4, wherein said indicia consist of magnetic pigments.

* * * * *